(12) United States Patent
Previdi et al.

(10) Patent No.: US 7,710,882 B1
(45) Date of Patent: May 4, 2010

(54) METHOD AND APPARATUS FOR COMPUTING ROUTING INFORMATION FOR A DATA COMMUNICATIONS NETWORK

(75) Inventors: Stefano Benedetto Previdi, Wavre (BE); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 10/792,945

(22) Filed: Mar. 3, 2004

(51) Int. Cl.
*H04L 12/26* (2006.01)
*H04L 12/28* (2006.01)
*H04L 12/56* (2006.01)

(52) U.S. Cl. .................. 370/238; 370/229; 370/254; 370/256; 370/395.32

(58) Field of Classification Search .............. 370/238, 370/254, 395.32, 256
See application file for complete search history.

(56) References Cited

U.S. PATENT DOCUMENTS

| | | | |
|---|---|---|---|
| 5,128,926 A * | 7/1992 | Perlman et al. ............ 370/248 |
| 5,243,592 A | 9/1993 | Perlman et al. |
| 5,253,248 A | 10/1993 | Dravida et al. |
| 5,265,092 A | 11/1993 | Soloway et al. |
| 5,825,772 A | 10/1998 | Dobbins et al. |
| 5,959,968 A | 9/1999 | Chin et al. |
| 5,999,286 A | 12/1999 | Venkatesan |
| 6,032,194 A | 2/2000 | Gai et al. |
| 6,044,075 A | 3/2000 | Le Boudec et al. |
| 6,098,107 A | 8/2000 | Narvaez-Guarnieri et al. |
| 6,111,257 A | 8/2000 | Shand et al. |
| 6,128,750 A | 10/2000 | Espy et al. |
| 6,185,598 B1 | 2/2001 | Farber et al. |
| 6,256,295 B1 | 7/2001 | Callon |
| 6,295,275 B1 | 9/2001 | Croslin |
| 6,321,271 B1 | 11/2001 | Kodialam et al. |
| 6,343,122 B1 | 1/2002 | Andersson |
| 6,349,091 B1 | 2/2002 | Li |
| 6,356,546 B1 | 3/2002 | Beshai |
| 6,449,279 B1 | 9/2002 | Beiser et al. |
| 6,473,421 B1 | 10/2002 | Tappan |

(Continued)

FOREIGN PATENT DOCUMENTS

CN          1440159 A          9/2003

(Continued)

OTHER PUBLICATIONS

Karn, "Improving Round Trip Time Estimates in Reliable Transport Protocols", 1987, ACM Transaction on Computer Systems, all pages.*

(Continued)

*Primary Examiner*—Kwang B Yao
*Assistant Examiner*—Adam Duda
(74) *Attorney, Agent, or Firm*—Hickman Palermo Truong & Becker LLP

(57) ABSTRACT

A method is disclosed for computing routing information for a data communications network comprising a plurality of nodes. The method comprises the step performed at a computing node of receiving from a remote node in the network a routing information update representing a change of state of the network. The method further comprises processing the update to identify a change of state type and setting, dependent on the change of state type, a delay interval after which routing information is to be computed from the update.

44 Claims, 16 Drawing Sheets

U.S. PATENT DOCUMENTS

| | | | |
|---|---|---|---|
| 6,507,577 | B1 | 1/2003 | Mauger et al. |
| 6,535,481 | B1 | 3/2003 | Andersson et al. |
| 6,578,086 | B1 | 6/2003 | Regan et al. |
| 6,668,282 | B1 | 12/2003 | Booth et al. |
| 6,690,671 | B1 | 2/2004 | Anbiah et al. |
| 6,697,325 | B1 | 2/2004 | Cain |
| 6,704,320 | B1 | 3/2004 | Narvaez et al. |
| 6,711,125 | B1 | 3/2004 | Walrand et al. |
| 6,714,551 | B1 | 3/2004 | Le-Ngoc |
| 6,778,531 | B1 | 8/2004 | Kodialam et al. |
| 6,928,484 | B1 | 8/2005 | Huai et al. |
| 6,944,131 | B2 | 9/2005 | Beshai et al. |
| 6,982,951 | B2 | 1/2006 | Doverspike et al. |
| 6,993,593 | B2 | 1/2006 | Iwata |
| 6,996,065 | B2 | 2/2006 | Kodialam et al. |
| 7,058,016 | B1 * | 6/2006 | Harper ..................... 370/238 |
| 7,065,059 | B1 | 6/2006 | Zinn |
| 7,099,286 | B1 | 8/2006 | Swallow |
| 7,113,481 | B2 | 9/2006 | Elie-Dit-Cosaque et al. |
| 7,158,486 | B2 | 1/2007 | Rhodes |
| 7,242,664 | B2 | 7/2007 | Einstein et al. |
| 7,248,579 | B1 | 7/2007 | Friedman |
| 7,260,645 | B2 | 8/2007 | Bays |
| 7,274,654 | B2 | 9/2007 | Yang et al. |
| 7,274,658 | B2 | 9/2007 | Bornstein et al. |
| 7,349,427 | B1 | 3/2008 | Canning et al. |
| 7,490,165 | B1 | 2/2009 | Katukam et al. |
| 7,500,013 | B2 | 3/2009 | Dziong et al. |
| 2002/0004843 | A1 | 1/2002 | Anderson et al. |
| 2002/0037010 | A1 | 3/2002 | Yamauchi |
| 2002/0093954 | A1 | 7/2002 | Weil et al. |
| 2002/0112072 | A1 | 8/2002 | Jain |
| 2002/0116669 | A1 | 8/2002 | Jain |
| 2002/0131362 | A1 | 9/2002 | Callon |
| 2002/0136223 | A1 | 9/2002 | Ho |
| 2002/0171886 | A1 | 11/2002 | Wu et al. |
| 2002/0172157 | A1 | 11/2002 | Rhodes |
| 2002/0191545 | A1 | 12/2002 | Pieda et al. |
| 2003/0063613 | A1 | 4/2003 | Carpini et al. |
| 2003/0079040 | A1 | 4/2003 | Jain et al. |
| 2003/0193959 | A1 | 10/2003 | Lui et al. |
| 2003/0210705 | A1 | 11/2003 | Seddigh et al. |
| 2004/0001497 | A1 | 1/2004 | Sharma |
| 2004/0001508 | A1 | 1/2004 | Zheng et al. |
| 2004/0071089 | A1 | 4/2004 | Bauer et al. |
| 2004/0085894 | A1 | 5/2004 | Wang et al. |
| 2004/0151181 | A1 | 8/2004 | Chu et al. |
| 2005/0007950 | A1 | 1/2005 | Liu |
| 2005/0031339 | A1 | 2/2005 | Qiao et al. |
| 2005/0038909 | A1 | 2/2005 | Yoshiba et al. |
| 2005/0097219 | A1 | 5/2005 | Goguen et al. |
| 2006/0018253 | A1 | 1/2006 | Windisch et al. |
| 2006/0221962 | A1 | 10/2006 | Previdi et al. |
| 2007/0011284 | A1 | 1/2007 | Le Roux et al. |
| 2007/0038767 | A1 | 2/2007 | Miles et al. |

FOREIGN PATENT DOCUMENTS

| | | |
|---|---|---|
| WO | WO 02/06918 | 1/2002 |

OTHER PUBLICATIONS

Backes, "I. Spanning Tree Bridges Transparent Bridges for Interconnection of IEEE 802 LANs", 1988, IEEE, all pages.*

Karn Phil et al., Improving Round-Trip Time Estimates in Reliable Transport Protocols, 1987, ACM workshop on Frontiers in computer communciation technology, pp. 2-7.*

Open System Interconnection Routing Protocol, Jun. 1999, Chapter 41, Internetworking Technologies handbook (all pages of chapter 41).*

Open Shortest Path First, Jun. 1999, Chapter 42, Internetworking Technologies handbook (all pages of chapter 42).*

Wang, Zheng et al., "Shortest Path First with Emergency Exits," ACM 089791-405-8/90/0009/0166, 1990, pp. 166-176.

International Searching Authority, International Search Report, PCT/US04/33827, dated Mar. 28, 2005, 8 pages.

Current Claims, PCT/US04/33827, 6 pages.

ISO/IEC 10589: "Information technology—Telecommunications and information exchange between systems—Intermediate System to Intermediate System intra-domain routeing information exchange protocol for use in conjunction with the protocol for providing the connectionless-mode network service", (ISO 8473), Second edition, Nov. 15, 2002, 208 pages.

Office Action from China for Foreign Patent Application 200480033399.8 dated Feb. 29, 2008 (4 pgs) with English Translation (4 pgs).

Current claims in China Patent Application 200480033399.8 (3 pgs) with marked up copy (4 pgs).

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

European Patent Office, "Supplementary European Search Report", application No. EP 04795045, May 27, 2009, 4 pages.

Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

State Intellectual Property Office of the People'S Republic of China, "The First Office Action", filing No. 200480026214.0, dated Jan. 9, 2009, 7 pages.

Current Claims, for foreign application No. PCT/US2004/033827, 5 pages.

Office Action from EPO for foreign patent application No. 04 800 942.7-1525 dated Apr. 4, 2009, (6 pgs).

European Patent Office, "Communication pursuant to Article 94(3) EPC", Application No. 04795045.6-2416, dated Sep. 7, 2009, 5 pages.

Current Claims, Application No. 04795045.6-2416, 5 pages. Claims current as of Sep. 7, 2009.

Karn, Phil et al., "Improving Round-Trip Time Estimates in Reliable Transport Protocols", *Computer Communication Review* (pp. 67-74), published Oct./Nov. 1987.

"Open System Interconnection Routing Protocol", Chapter 45, Internetworking Technologies Handbook (pp. 45-1 through 45-8), Jan. 1, 1997.

"Open Shortest Path First", Chapter 46, Internetworking Technologies Handbook (pp. 46-1 through 46-6), Sep. 21, 2003.

* cited by examiner

METHOD AND APPARATUS FOR COMPUTING ROUTING INFORMATION FOR A DATA COMMUNICATIONS NETWORK

FIELD OF THE INVENTION

The present invention generally relates to a data communications network. The invention relates more specifically to a method and apparatus for computing routing information for a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node (the "first node"), the first node identifies the optimum route to that destination and forwards the packet to the next node along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

Problems arise in known systems when multiple changes are advertised successively. A node receiving the corresponding LSPs recalculates the SPF each time. Multiple successive SPF calculations comprise a significant processing burden on the computing node, however.

One known solution is to make use of an "exponential back off algorithm" to compute successively increasing delays between receipt of LSPs and subsequent calculation of the SPF if multiple LSPs are received in quick succession. An exponential back-off approach for use in transport protocols is described, for example, in P. Karn et al., "Improving Round-trip Time Estimates in Reliable Transport Protocols," ACM SIGCOMM Computer Communication Review, at 67, and can be adapted for use in SPF calculation. One such algorithm is explained here with reference to FIG. 1 which is a high-level flow diagram illustrating operation of such an algorithm. The algorithm operation is based on three parameters termed here A, B and C and which are defined as follows:

A is the maximum permitted delay between two consecutive SPF computations;

B is the initial delay interval that is applied when the router or computing node has to run an SPF for the first time or after a "quiet period" (which is discussed in more detail below); and C is the "secondary wait" or increment that is added to the delay interval in the manner described below.

The "quiet period" can be any predetermined period of time during which no SPF computations have been triggered in which case the initial delay B can be set as the delay period. Here the "quiet period" is set at a period 2*A.

Referring to the flow diagram of FIG. 1, in block 102 the computing node receives the LSP. In block 104 the node checks whether there has been a quiet period, that is, whether the node has run any SPF during the preceding period 2*A. If there has been a quiet period then at block 106 the node sets the routing calculation delay as the initial delay B. In block 108 the node sets a value next_delay=C and then loops back to block 102.

If, in block 104, the node detects that there has not been a quiet period, that is, there has been a SPF calculation within the preceding period 2*A, then at block 110 the node sets the delay value to next_delay−elapsed_time_since_last_SPF. In block 112 the node increments the value of next_delay for example by doubling it. However the value of next_delay cannot exceed the maximum delay value A. In particular the computing node computes next_delay=MIN (A, next_delay*2). The algorithm then loops back to block 102.

As a result the computing node will react very quickly to a newly received LSP if it is the first LSP or if it is received after a quiet period. However the algorithm increases the delay between consecutive computations by incrementing the value of C if such computations have to be done in a short period of time. A problem with this approach, however, is that in some instances SPF computations can be delayed to a significant extent. This can give rise to problems when a network change occurs requiring rapid response. In addition in some instances as a result of the delay looping can take place. This can arise because of discrepancies between SPTs on different nodes where each node implements lengthy delays or delays of different periods.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for computing routing information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview 2.0 Structural and Functional Overview 3.0 Method of Computing Routing Information 4.0 Implementation Mechanisms—Hardware Overview 5.0 Extensions and Alternatives 1.0 General Overview The needs identified in the foregoing Background, and other needs and objects that will become apparent for the following description, are achieved in the present invention, which comprises, in one aspect, a method for computing routing information for a data communications network comprising a plurality of nodes. The method comprises the step, performed at a computing node, of receiving from a remote node in the network a routing information update representing a change of state of the network. The method further comprises the step of processing the update to identify change of state and setting, dependent on the change of state type, a delay interval after which routing information is to be computed from the update.

In other aspects, the invention encompasses a computer apparatus and a computer-readable medium configured to carry out the foregoing steps.

2.0 Structural and Functional Overview

Figure 2:
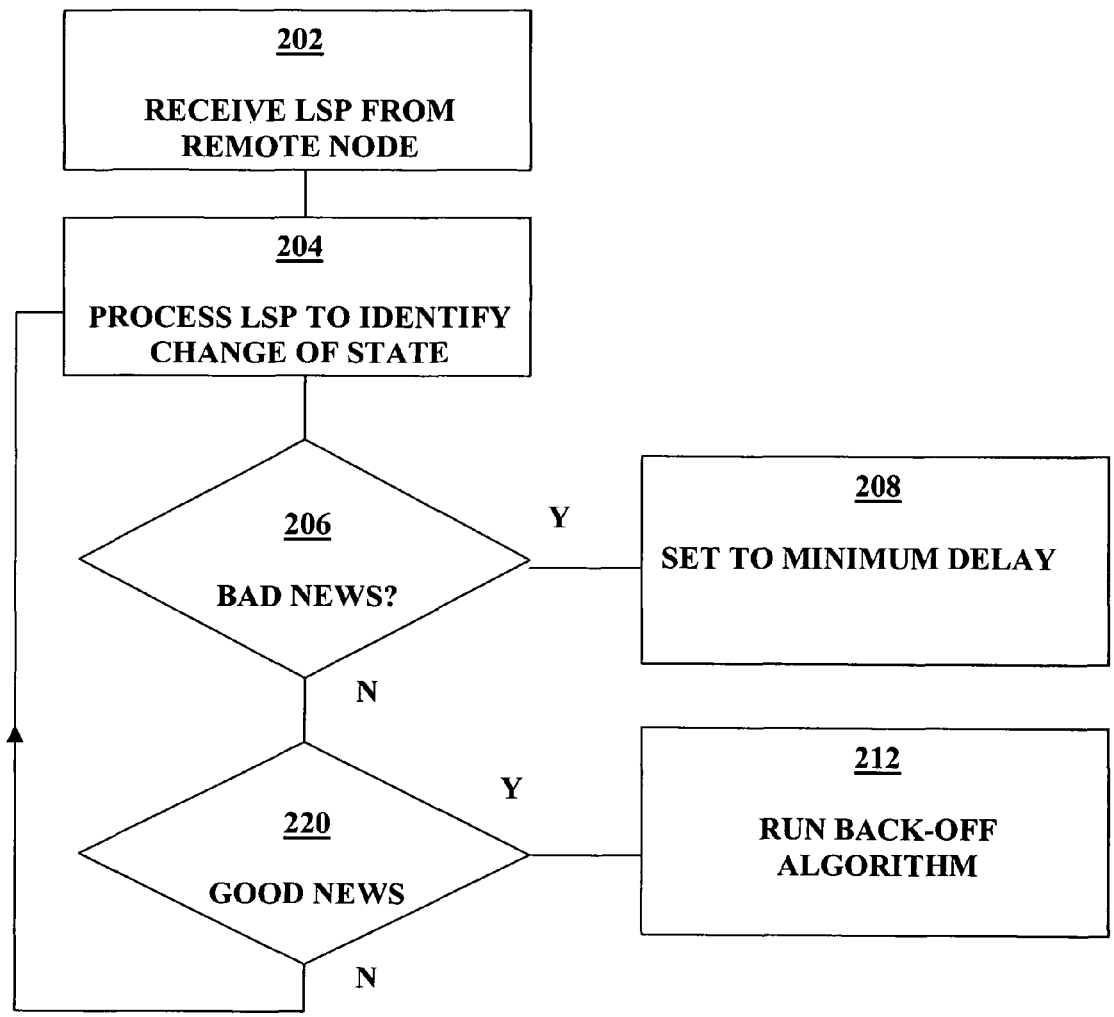
FIG. 2 is a flow diagram illustrating a high level view of a method for computing routing information at a computing node.

In overview a method of routing information is provide which can be understood with reference to FIG. 2 which is a flow diagram illustrating a high level view of the method employed.

Referring to FIG. 2 a router in a network which we will designate here the computing node receives in block 202 a routing information update for example in the form of an LSP from another node in the network which we will term a remote node. As discussed above the LSP is generated as a result of a change of state in the network and contains information regarding the change of state. In block 204 the computing node processes the LSP in the manner described in more detail below to identify the change of state as a result of which it was generated. The computing node then computes a delay interval dependent on the change of state type which may be a first change of state type delay interval termed here "bad news" or a second change of state type interval termed here "good news". In particular, in block 206, if the computing node identified that the change of state represents bad news then in block 208 the delay interval is set to a minimum delay. Otherwise the algorithm proceeds to block 220 and if there is good news then in block 212 the computing node runs a back-off algorithm for example of the type discussed above.

As a result of this method different delay intervals are applied dependent on the change of state type. For example bad news can occur when the change of state comprises removal of a neighbor node to the remote node issuing the LSP in which case the LSP will not contain details of the deleted neighbor node. Alternatively the metric associated with a neighbor (for example the cost to reach the neighbor across the link with the remote node) may have increased such that the shape of the spanning tree has to be changed. In such instances problems such as looping can arise as a result of which it is desirable to implement the SPF computation as quickly as possible. More generally, bad news means that traffic flows may be interrupted somewhere in the network and an alternate path to a set of destinations need to be recomputed as fast as possible in order to limit the impact of the failure for example loss of traffic. On the other hand good news can occur for example when new neighbors to the remote node are advertised or if the existing neighbors to the remote node have, as a result of the change of state, a better metric (e.g. improved cost) such that the shape of the spanning tree needs to be changed. Generally there is no traffic loss impact and the computing node can react more slowly. Accordingly, in those cases, unless looping is otherwise likely to occur, it is permissible to apply an exponentially or otherwise incrementally increasing back-off algorithm of the type described above and effectively increase the delay before computation of the SPF.

It will be appreciate that other possible states exist. The first of these is termed here "no news". This can occur when the state change advertised in the new LSP has no impact on the shape of the existing SPT. This can include for example bad news in relation to a link which is not in the SPT. Finally a further state is termed here "unknown". This can occur when the router was unable to evaluate the state change type. Referring to FIG. 2 once again it will be seen that in the event neither bad news nor good news are identified then block 220 returns to block 204 where the processing of the LSP continues for each neighbor node of the remote node.

In an optimization, where bad news is detected for multiple, rapidly occurring successive LSPs then the benefit of computing the respective SPFs quickly can be outweighed by the increased processing burden. Accordingly a threshold can be applied and if the number of LSPs carrying bad news exceeds the threshold then the computing node can revert to implementation of a back-off algorithm.

3.0 Method of Computing Routing Information

Figure 1:
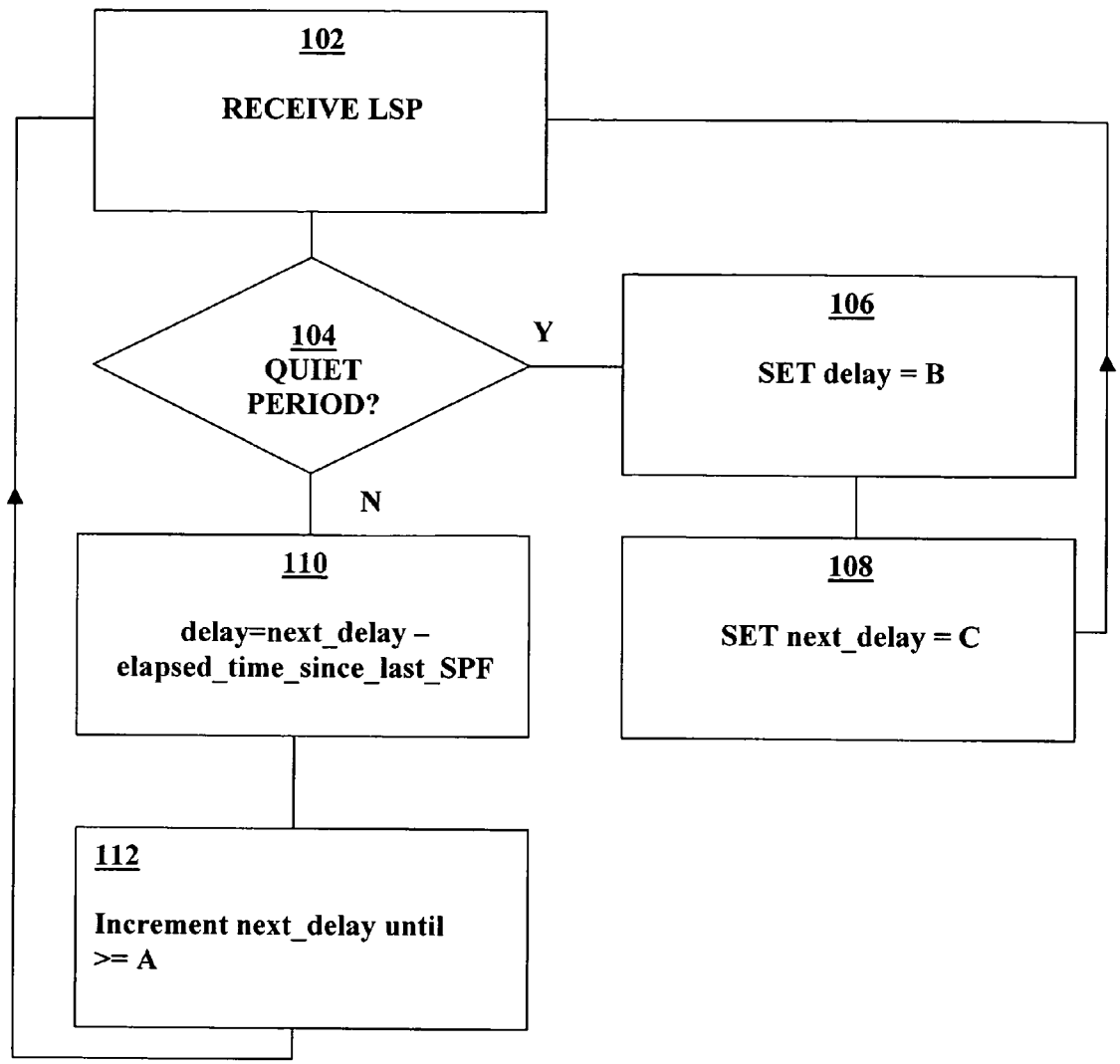
FIG. 1 is a flow diagram that illustrates a high level overview of a known exponential back-off algorithm.

For purposes of illustrating a clear example, the method described herein in some instances refers to implementation of a back-off algorithm of the type described in FIG. 1. However the method described herein is not limited to the context of FIG. 1 and any appropriate back-off or delaying algorithm or equivalent approach may be adopted upon detection of the appropriate change of state type.

The method described herein can be implemented according to any appropriate routing protocol. Generally, link state protocols such as Intermediate System to Intermediate System (IS-IS) or Open Shortest Path First (OSPF) are appropriate protocols. Link state protocols of this type are well understood by the skilled reader and well documented in pre-existing documentation, and therefore are not described in detail here.

Figure 3:
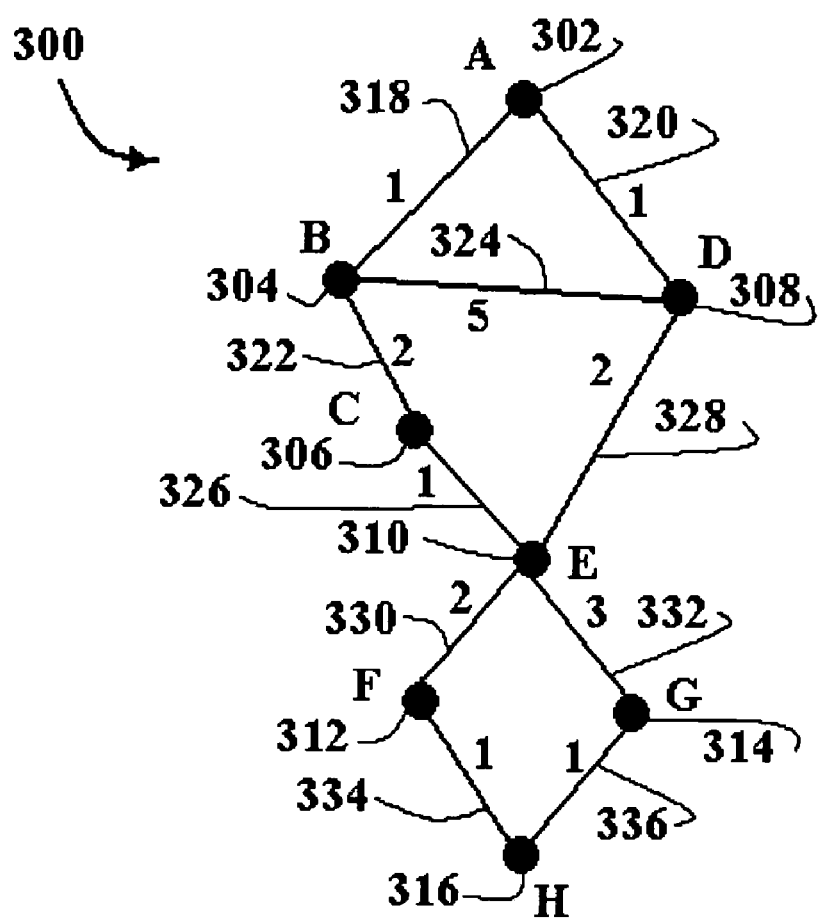
FIG. 3 is a representation of a network illustrating a method of computing routing information at a computing node.

FIG. 3 is a network diagram showing one illustrative simple network to which the method described herein is applied. The network 300 includes nodes A, B, C, D, E, F, G, H reference 302, 304, 306, 308, 310, 312, 314, and 316, respectively. Various of the nodes are connected by links with associated costs. In particular node A is connected to node B by link 318 cost 1 and to node D by link 320 cost 1. Node B is connected to node C by link 322 cost 2 and to node D by link 324 cost 5. Node C is connected to node E by link 326, cost 1 and node D is connected to node E by link 328 cost 2. Node E is connected to node F by link 330 cost 2 and to node G by link 332 cost 3. Node F is connected to node H by link 334 cost 1 and node G is connected to node H by link 336 cost 1.

Figure 4:
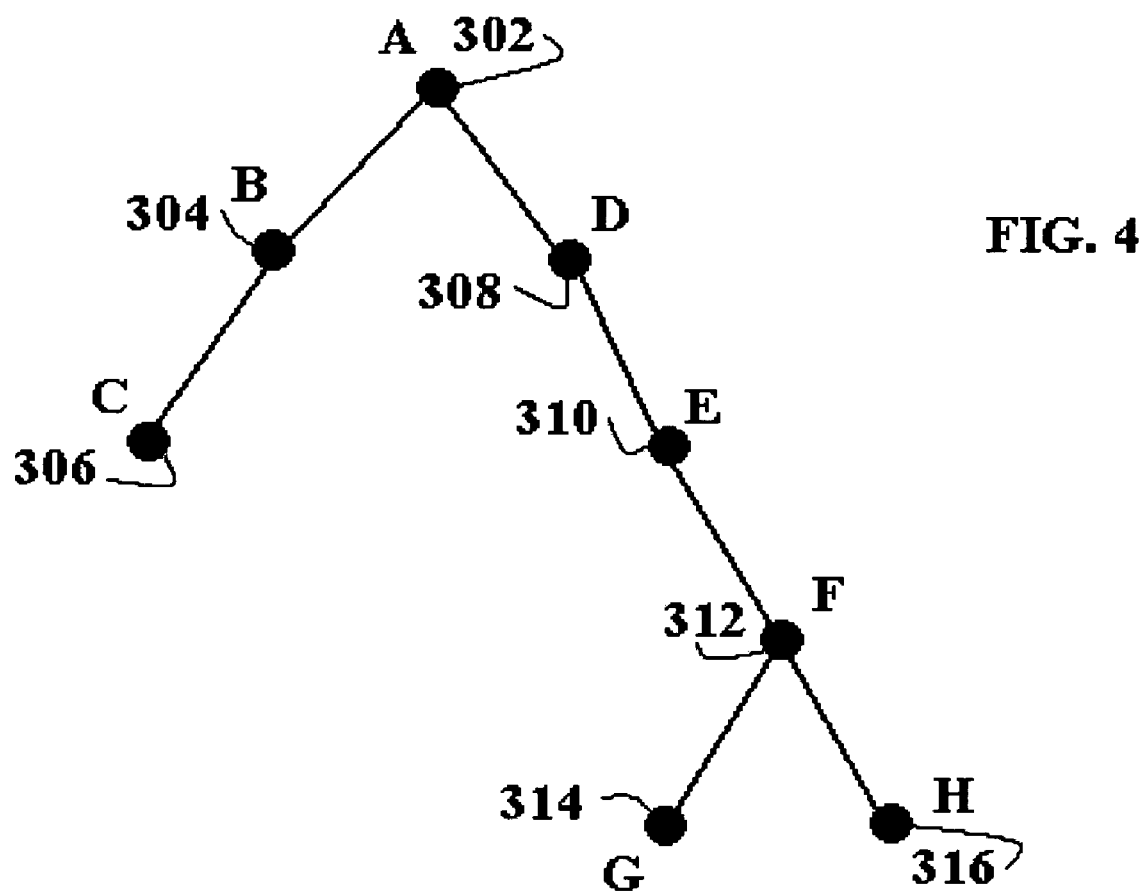
FIG. 4 is a representation of a spanning tree rooted at a computing node for the network of FIG. 3 illustrating a method of computing routing information at a computing node.

FIG. 4 is a spanning tree diagram for node A in the network shown in FIG. 3 such that node A is the root of the spanning tree. As discussed above the spanning tree represents the lowest cost route from node A to each of the other nodes in the network. For example node A directs packets to node C via node B at a cost 2 but to node E via node D at a cost 3 rather than via nodes B and C at a cost 4. In the terminology adopted herein, node A is a "parent node" for nodes B and D and nodes B and D are "child nodes" of node A and a similar relationship is maintained between all other adjacent nodes on the spanning tree diagram.

When there is a change in the network, for example addition or removal of a node, or a change in the cost of a link, this is advertised by each node adjacent to the change in an LSP. For the purposes of illustration we will select here node E as the advertising node or remote node. The LSP issued by node E carries various information including for example the information identifying all the neighbors to node E following the change of state of the network. The LSP also carries the associated metric for example the cost of the link joining node E and each of its neighboring nodes. It will be appreciated that the information can be presented in any appropriate manner but one approach using the intermediate system—intermediate system (IS-IS) protocol is to issue the information via a suitable TLV. The protocol is well understood by the skilled reader and is described, for example, in International Standard ISO10589 and therefore is not described in detail here. However appropriate TLV fields include TLV2 and/or TLV22.

It will be seen that, following a change of state and receipt of an LSP, when an SPF is calculated this can impact on the spanning tree in various ways. For example a new neighbor may be introduced relative to the remote node on the spanning tree as a parent or a child. Furthermore a new neighbor of the remote node within the network may appear as a neighbor on a separate branch of the spanning tree. This is because only lowest cost route neighbors within a network are neighbors within a spanning tree; see for example nodes B and D which are neighbors in the network shown in FIG. 3 but which are not neighbors on the spanning tree shown in FIG. 4. Where clarification is necessary, therefore, when neighbors within the network are referred to hereafter they are termed "network neighbors" whereas nodes that are only neighbors in a spanning tree are termed "spanning tree neighbors". SPT neighbors are of course also network neighbors, and can always be defined in terms of the parent/child relationship.

The spanning tree can also be affected if an existing network neighbor to the remote node has an improved or worse metric, or no longer exists following the state change. In other instances again a change of state may not affect the spanning tree at all.

According to the method described herein, the routing calculating delay, that is the delay interval from the receipt of the LSP to computation of the SPF to revise the spanning tree, is selected on the type of state change in the manner discussed with reference to FIGS. 5 to 13 below.

Figure 5:
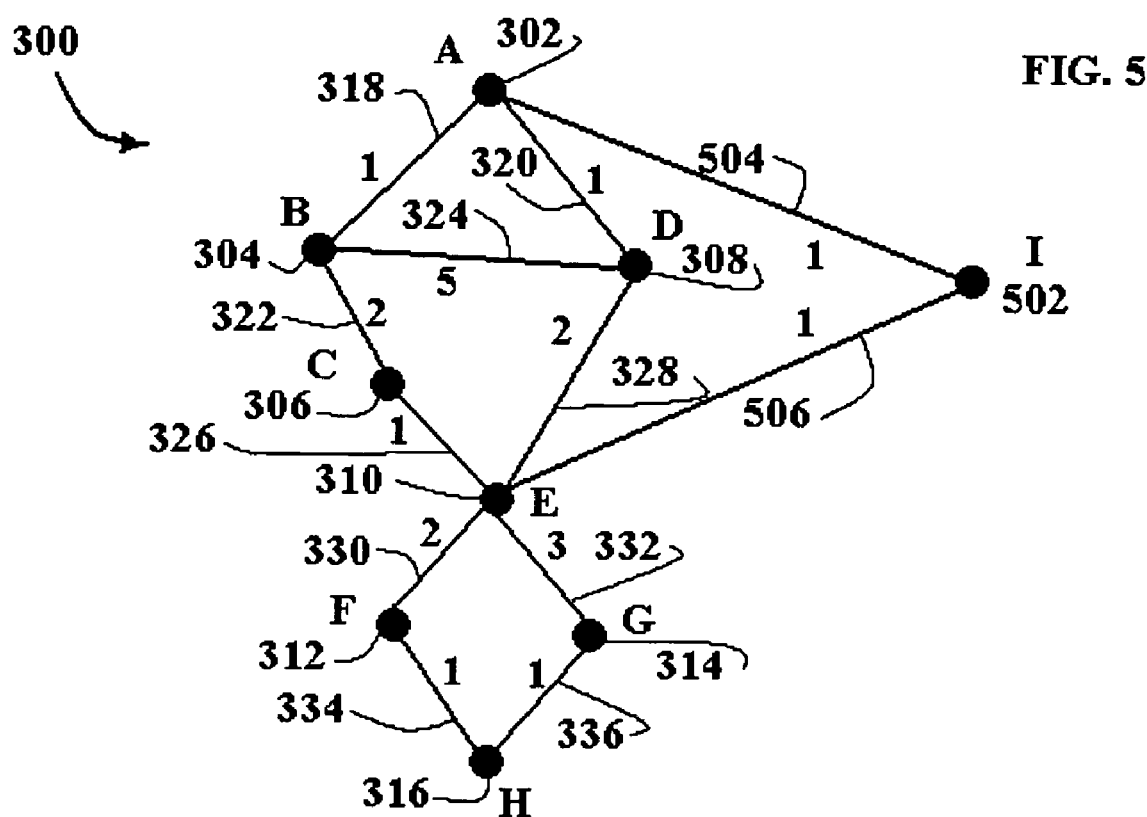
FIG. 5 is a representation of a network corresponding to that of FIG. 3 but following a change of state illustrating a method of computing routing information.
Figure 6:
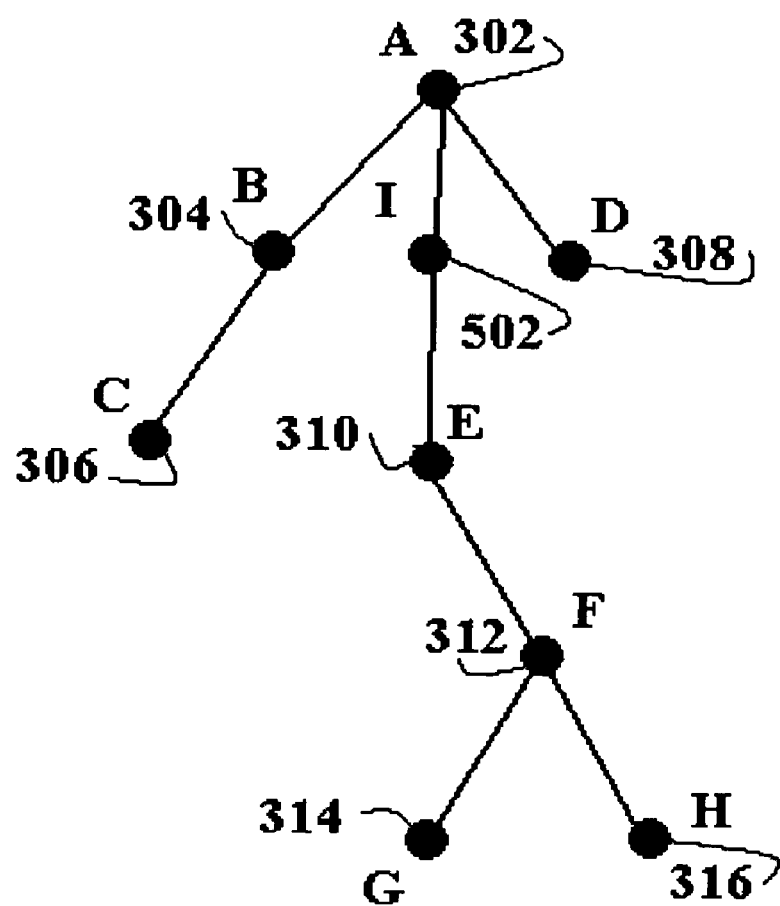
FIG. 6 is a representation of a spanning tree corresponding to the network of FIG. 5 illustrating a method of computing routing information at a computing node.

Various possible state changes are now illustrated with regard to FIG. 5 to FIG. 11. FIG. 5 is a network diagram illustrating one change of state of the network in which a new neighbor node I, reference 502, has been introduced upstream of node E and connected to node A by link 504, cost 1 and to node E by link 506, cost 1. FIG. 6 is a diagram illustrating the spanning tree derived at node A for the updated network. As can be seen node A now reaches node E via node I (cost 2) rather than via node D (cost 3).

Figure 7:
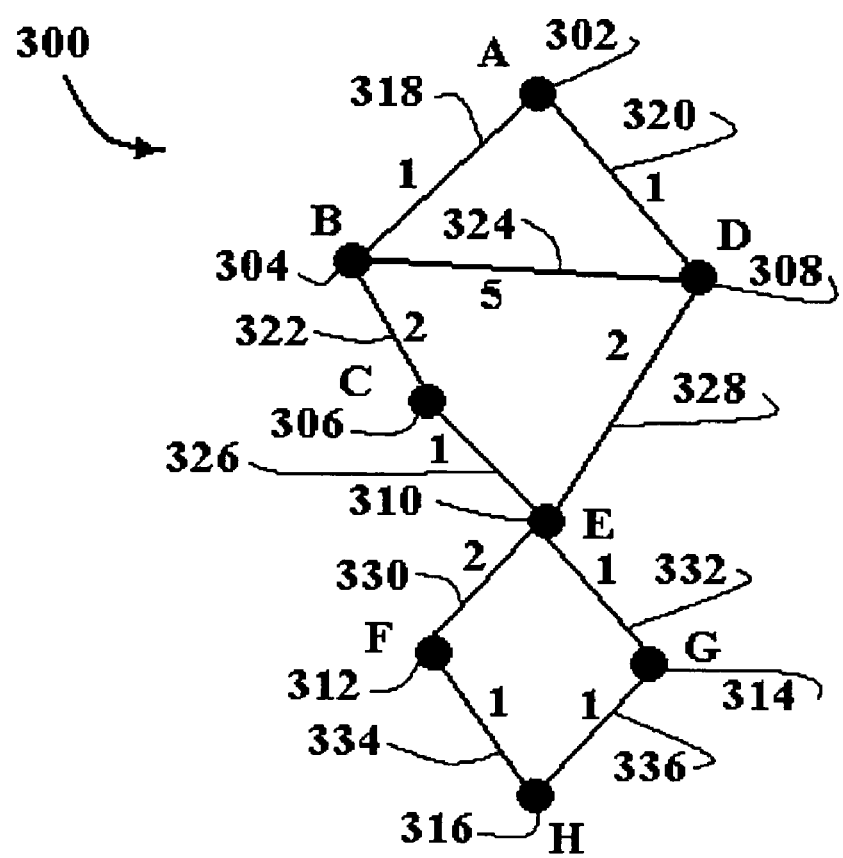
FIG. 7 is a representation of a network corresponding to that of FIG. 3 but following a change of state illustrating a method of computing routing information.
Figure 8:
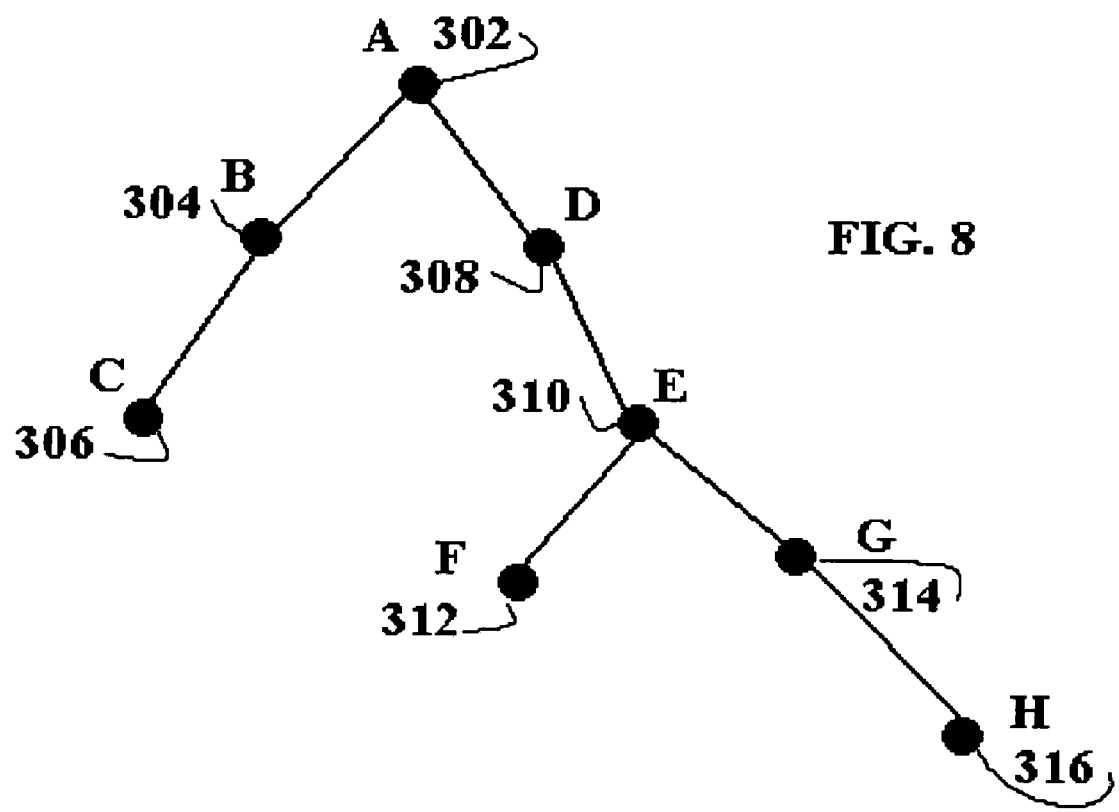
FIG. 8 is a representation of a spanning tree corresponding to the network of FIG. 7 illustrating a method of computing routing information at a computing node.

A further possible state change is illustrated in FIG. 7 which is a network diagram illustrating a possible change of state to the network of FIG. 3. In particular the cost of link 332 has been reduced from 3 to 1. As can be seen from FIG. 8 which is a diagram illustrating the spanning tree derived at node A for the updated network of FIG. 7, node E now reaches node H via node G (cost 2) rather than via node F (cost 3). In this instance, therefore, it can be seen that the state of change comprises an improved metric for an existing downstream network neighbor which has altered the configuration of the spanning tree as a result.

Figure 9:
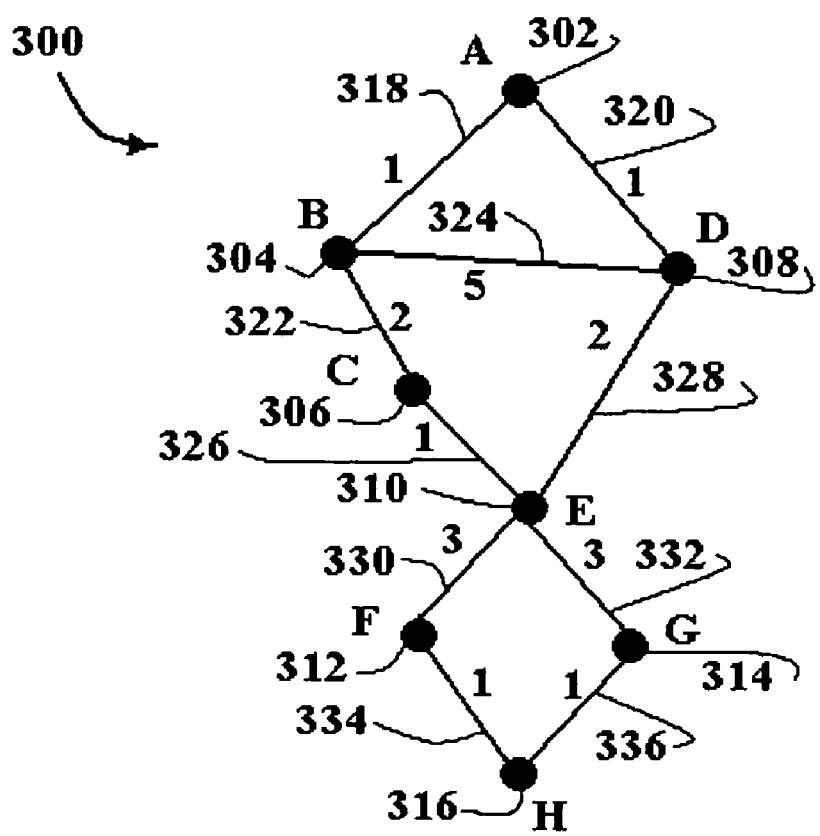
FIG. 9 is a representation of a network corresponding to that of FIG. 3 but following a change of state illustrating a method of computing routing information.
Figure 10:
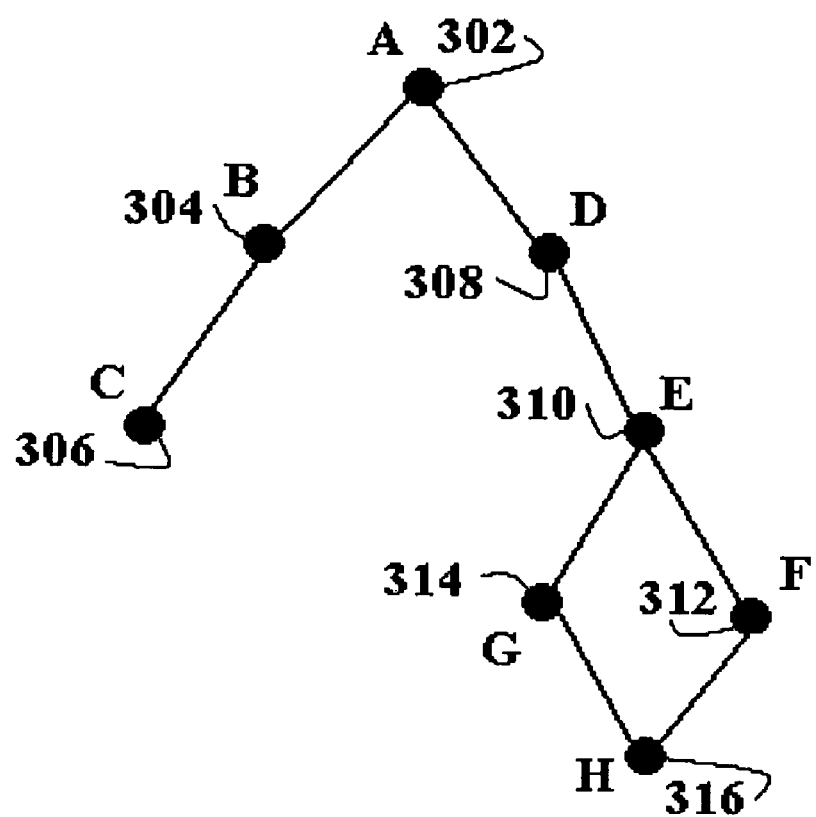
FIG. 10 is a representation of a spanning tree corresponding to the network of FIG. 9 illustrating a method of computing routing information at a computing node.

FIG. 9 is a network diagram illustrating a further possible change of state to the network of FIG. 3. In this case the cost of link 330 between nodes E and F is increased from 2 to 3. Referring to FIG. 10 which is a diagram illustrating the spanning tree derived at node A for the updated network of FIG. 9 it will be seen that the cost from node E to node H is now equal as cost 4 either via node F or node G, termed an "equal cost path split". In other words the change of state is that a downstream existing network neighbor has a worse metric resulting in a change to the spanning tree.

Figure 11:
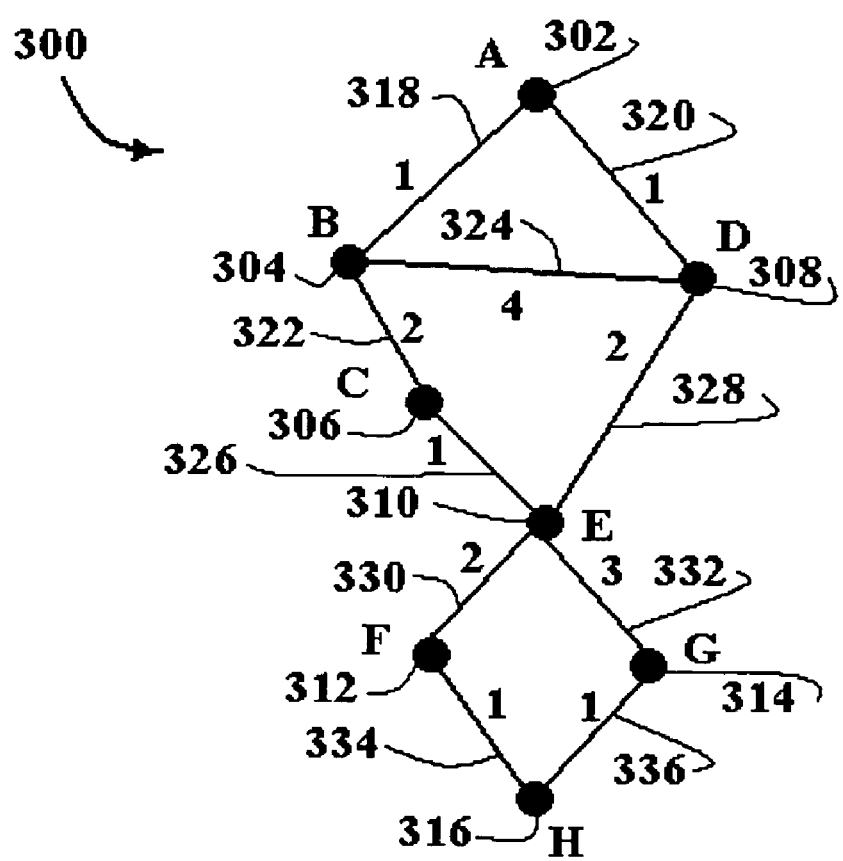
FIG. 11 is a representation of a network corresponding to that of FIGS. 5, 7 and 9 but following a change of state illustrating a method of computing routing information.

FIG. 11 is a network diagram illustrating a further possible change of state to the network of FIG. 3. In particular the link 324 between nodes A and E has reduced in cost from 5 to 4. However this does not affect the spanning tree as the lowest cost route from node A to node E is still via node D at cost 3.

Figure 12A:
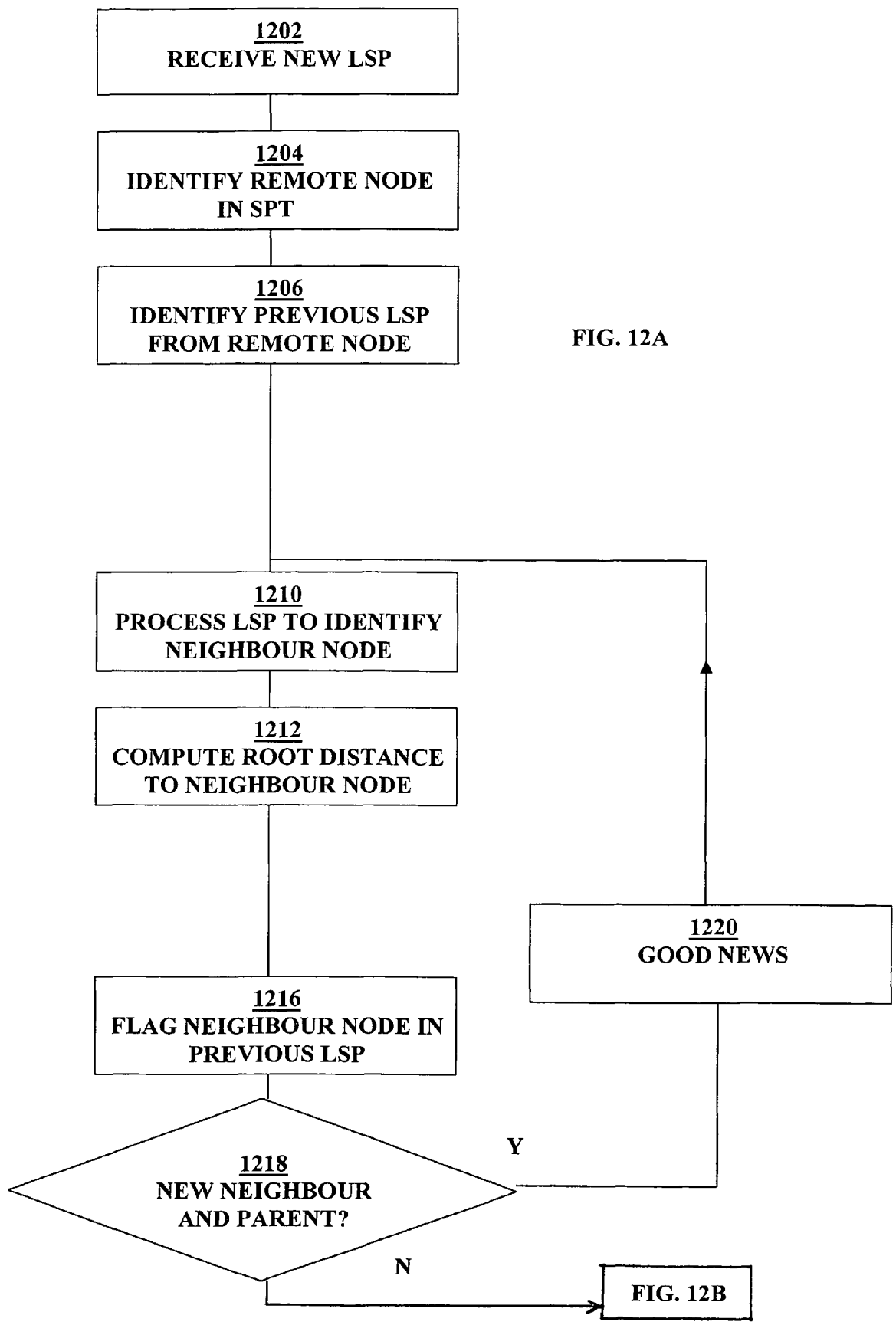
FIG. 12A is a flow diagram illustrating in more detail the steps involved in identifying a change of state type at a computing node.
Figure 12B:
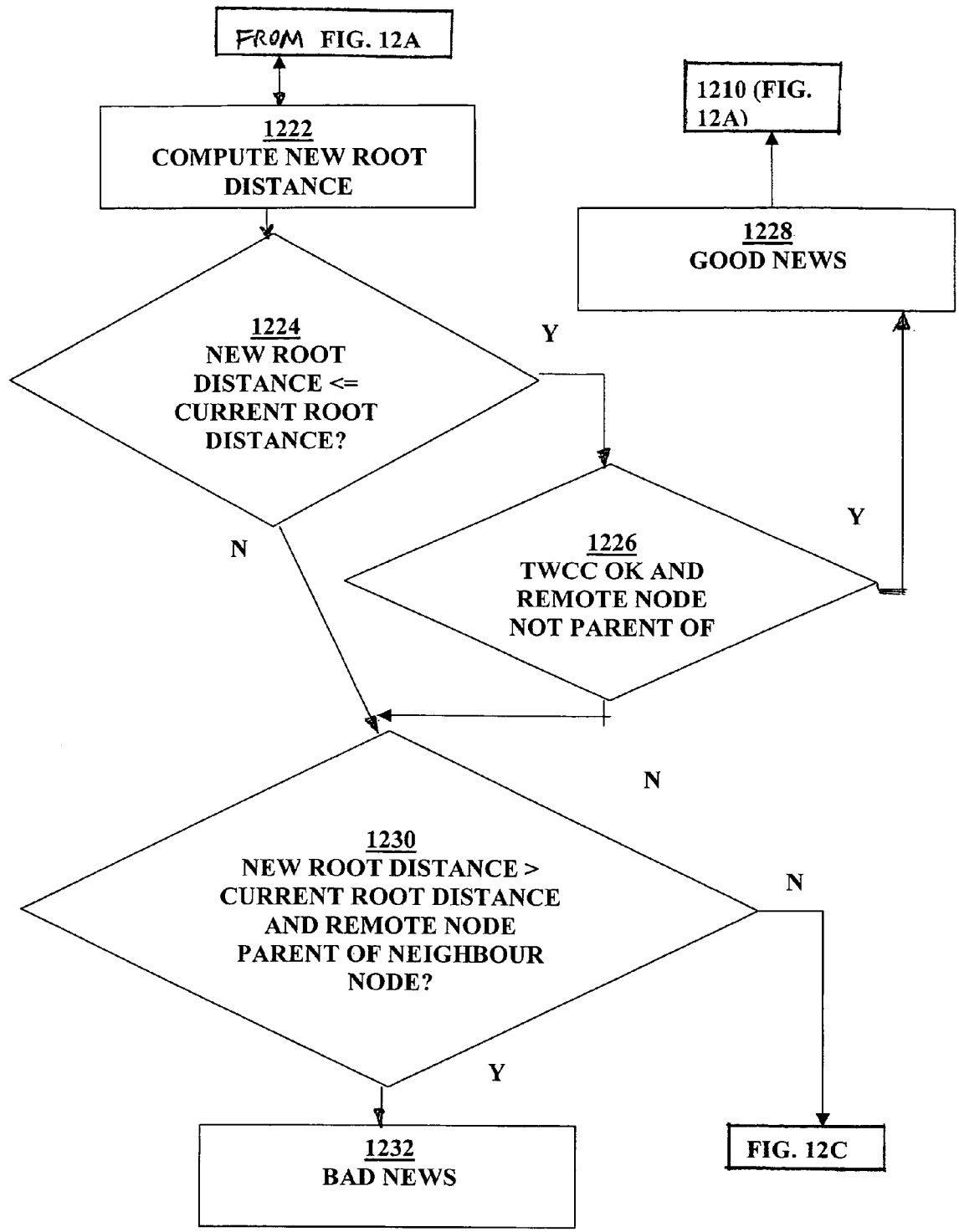
FIG. 12B is a flow diagram comprising a continuation of FIG. 12A.
Figure 12C:
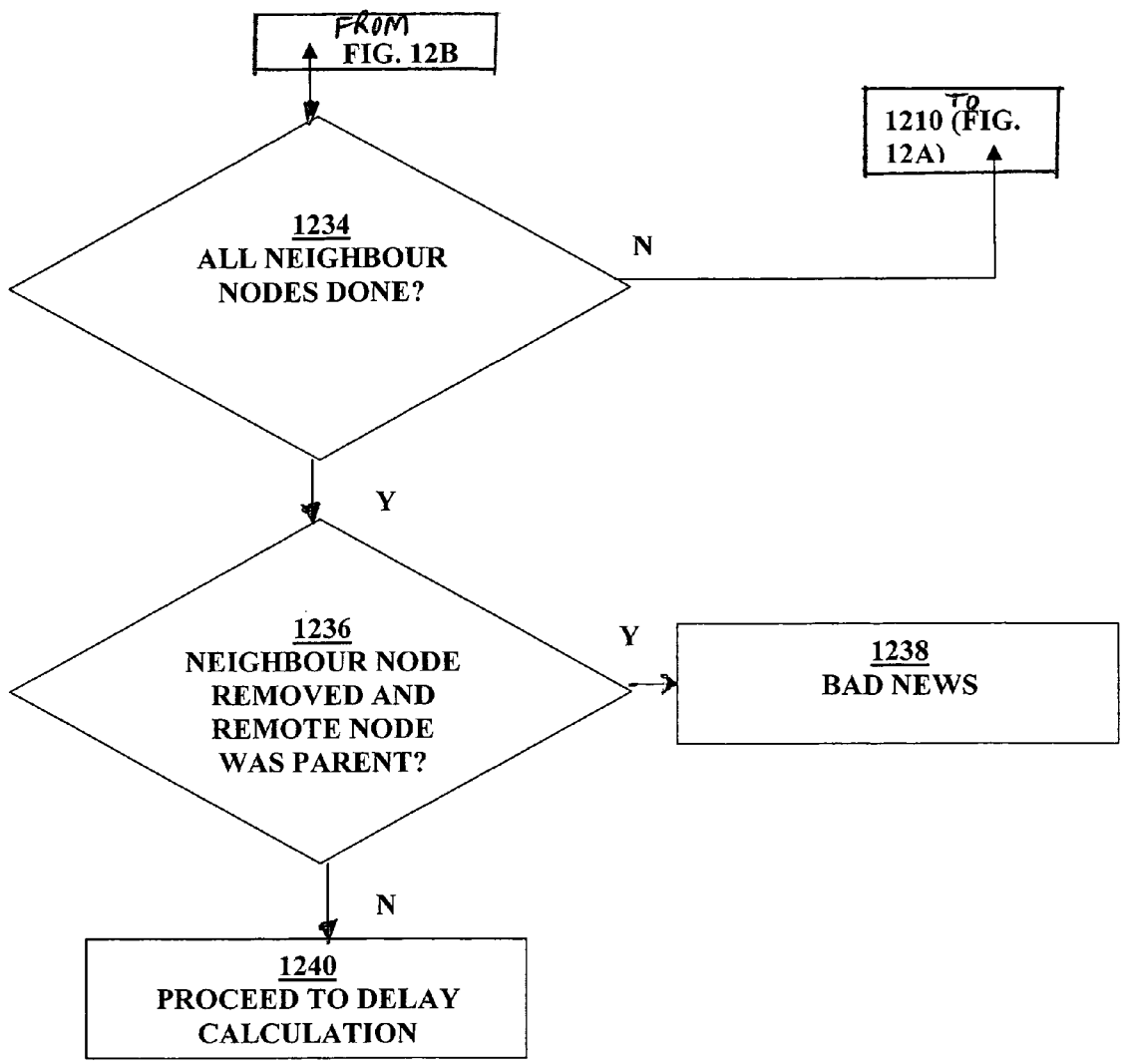
FIG. 12C is a flow diagram comprising a continuation of FIG. 12B.

As can be seen a large number of possible changes of state are available and the method by which the type of state change is identified can be understood with reference to FIGS. 12A to 12C which show a flow diagram illustrating in more detail identification of the change of state type. The flow diagram includes block 1202 at which the process is triggered by receipt of a new LSP at the computing node. In order to assess the change of state, in block 1204 the computing node identifies in its SPT the remote node issuing the LSP termed here "NewLSPnode". For example referring to FIG. 3 this is the remote node E. In block 1206 the computing node obtains the most recent LSP issued by the remote node prior to the current change of state. This previous LSP is termed "OldversionNewLSP".

The new LSP representing the current change of state includes information on each neighbor node to the remote node issuing the LSP including the associated cost (or other metrics) and the next set of steps allow walk through of the LSP to obtain and process the information in relation to each network neighbor. Accordingly in block 1210 the computing node processes the newly received LSP to identify a network neighbor node termed here "neighborNode". In particular the computing node repeats the steps described below for each encountered neighbor TLV as described in more detail below.

In block 1212 the computing node computes the root distance of the network neighbor node, that is, the cost of reaching the node from the root of the SPT. This value is termed "current_root_distance". For example referring to FIG. 4, when node E is the remote node and node A is the route or computing node then the root distance to network neighbor node G is 6 and the root distance to node F is 5.

In block 1216 the neighbor node is flagged in the previous LSP (OldVersionNewLSP) for purposes is described in more detail below. In particular the computing node flags the corresponding neighbor node TLV in OldVersionNewLSP as "found_in_new_LSP".

In block 1218 the computing node checks whether the neighbor node is a new neighbor of the remote node (for example by identifying that there is no such neighbor node to flag in the previous LSP at block 1216). The computing node further checks if the new neighbor can become the SPT parent of the remote node once the SPF is recalculated. If this is the case then at block 1220 the computing node identifies this as good news and returns to block 1210 to repeat the process for the next identified neighbor node of the remote node. If the neighbor node is not a new neighbor node and would not be a parent in the revised SPT then the computing node proceeds to block 1222 (FIG. 12B). In block 1222 the computing node computes the new root distance of the neighbor node which is defined as the sum of the remote node root distance (i.e. the distance from the root node to the remote node) and the metric of the neighbor node TLV, that is, the cost associated with the neighbor node across the link from the remote node. This provides: new_root_distance=NewLSPnode root distance+ neighbor node TLV metric. Referring once again to FIG. 4, where node A is the root node and computing node, node E is the remote node and node G is the neighbor node, and assuming that the metric for the TLV for node G (i.e. the cost) is 1 then the new root distance is 4. Where node F is the neighbor node and the cost is 3 then the new root distance is 6.

In block 1224 the computing node establishes whether the new root distance comprises an improved or equivalent metric (cost) to the current_root_distance. An example of where this is the case is shown in FIG. 7 in which the metric for neighbor node G decreases from 3 to 1 following a change of state. As a result the new root distance is 4 as against the current root distance of 6. In this case the computing node ensures that both sides of the link between nodes E and G are visible to each other for example by verifying the TWCC, in the manner that will be apparent to the skilled reader and does not require further description here. At block 1226 if the TWCC is verified and the remote node is not the SPT parent of the neighbor node (in the existing spanning tree as the new one is yet to be calculated of course) then in block 1228 this is identified as good news and the computing node reverts to block 1210 in FIG. 12a to repeat the process for the next network neighbor node. It will be seen that "good news" has been identified because the standard delay for example as determined by the back-off algorithm will not adversely affect operation of the network as discussed in more detail below.

If in blocks 1224 and 1226 the conditions for identification of "good news" are not identified then the computing node proceeds to block 1230. In block 1230 the computing node identifies whether the new root distance is higher than the current root distance and if the remote node is the spanning tree parent of the neighbor node. If these conditions are met then in block 1232 the computing node identifies the LSP as "bad news". This can be seen, for example, with reference to FIG. 9 in which the metric 4 node E to node F has increased from cost 2 to cost 3. In addition in those circumstances it will be seen that the risk of looping because of lack of synchronization between nodes increases such that more rapid calculation of the SPF at the computing node is desirable.

Once bad news is detected in block 1232 the computing node can proceed to the next steps of calculating and implementing a corresponding routing calculation delay. There is no need to repeat the assessment procedure for the remainder of the LSP as at least one possibility for looping or other non-optimum network performance has been identified resulting from the change of state. However if the requirements for "bad news" are not met then the computing node proceeds from block 1230 to block 1234 at FIG. 12C. In block 1234 the computing node establishes whether the process has been repeated for all neighbor nodes in the change of state notification, that is, whether the new LSP has been completely walked through.

If not then the computer returns to step 1210 and repeats the process for the next neighbor node. Otherwise, in block 1236 the computing node establishes whether previously advertised neighbors have been removed in the new LSP, that is, whether the change of state comprises removal of a neighboring node from the remote node issuing the change of state advertisement. In particular this is achieved by checking whether every neighbor in OldVersionNewLSP has been flagged as "found_in_new_LSP". It will be recalled that the flags were set in the previous LSP at step 1216 discussed above with reference to FIG. 12A.

If any of those neighbors have not been flagged this must mean that the neighbor TLV is not present in the new version of the LSP. If the TLV is not advertised any more and the remote node was the SPT parent of the neighbor node then at step 1238 this is identified by the computing node as "bad news" and the corresponding delays are calculated accordingly. Otherwise at step 1240 the computing node proceeds to the delay calculation stage discussed in more detail below. It will be appreciated that although step 1236 comprising identification of any removed neighbor nodes is discussed above as being carried out once all neighbor nodes have been assessed, alternatively it can be carried out as part of the assessment procedure for each individual neighbor node and the steps involved repeated accordingly.

It will be seen that, as a result, the computing node will have established what type of news the new LSP carries. In the event that bad news is identified the process stops immediately and the computing node moves on to calculate a shortened delay interval as described below. Otherwise the process is repeated and the news is identified as good news, no news or unknown news. Once the LSP has been fully walked through then the computing node proceeds to the delay calculation algorithm discussed in more detail below with reference to FIG. 13 which is a flow diagram showing in more detail computation of the routing calculation delay.

In overview if the LSP is found to contain only good news, or good news, no news and/or unknown news, then any appropriate back-off algorithm, for example the exponential back-off algorithm described above with reference to FIG. 1, can be implemented. However as discussed above in the event that there is bad news then the computing node is required to compute SPFs more rapidly to minimize the effect of associated traffic interruption in the network. Similarly if good news is detected but microloops are also detected then a more rapid SPF calculation is required.

Microloops can be detected in any appropriate manner, for example described in co-pending patent application Ser. No. 10/346,051, filed Jan. 15, 2003, entitled "Method and Apparatus for Determining a Data Communication Network Repair Strategy" of Michael Shand, (hereinafter referred to as Shand), the entire contents of which are incorporated by reference for all purposes as fully set forth herein. According to the approach described in Shand when a node detects a failure it institutes a repair path and sends a loop detection packet along the path. If the node receives the loop detection packet back then a loop is detected.

In the event that the computing node receives multiple LSPs representing bad news then a possible consequence is that multiple SPFs would be run effectively concurrently, occupying a significant proportion of the processing capability at the node. In that case in an optimization a threshold is set to limit the number of SPF computations occurring at the same time.

Figure 13:
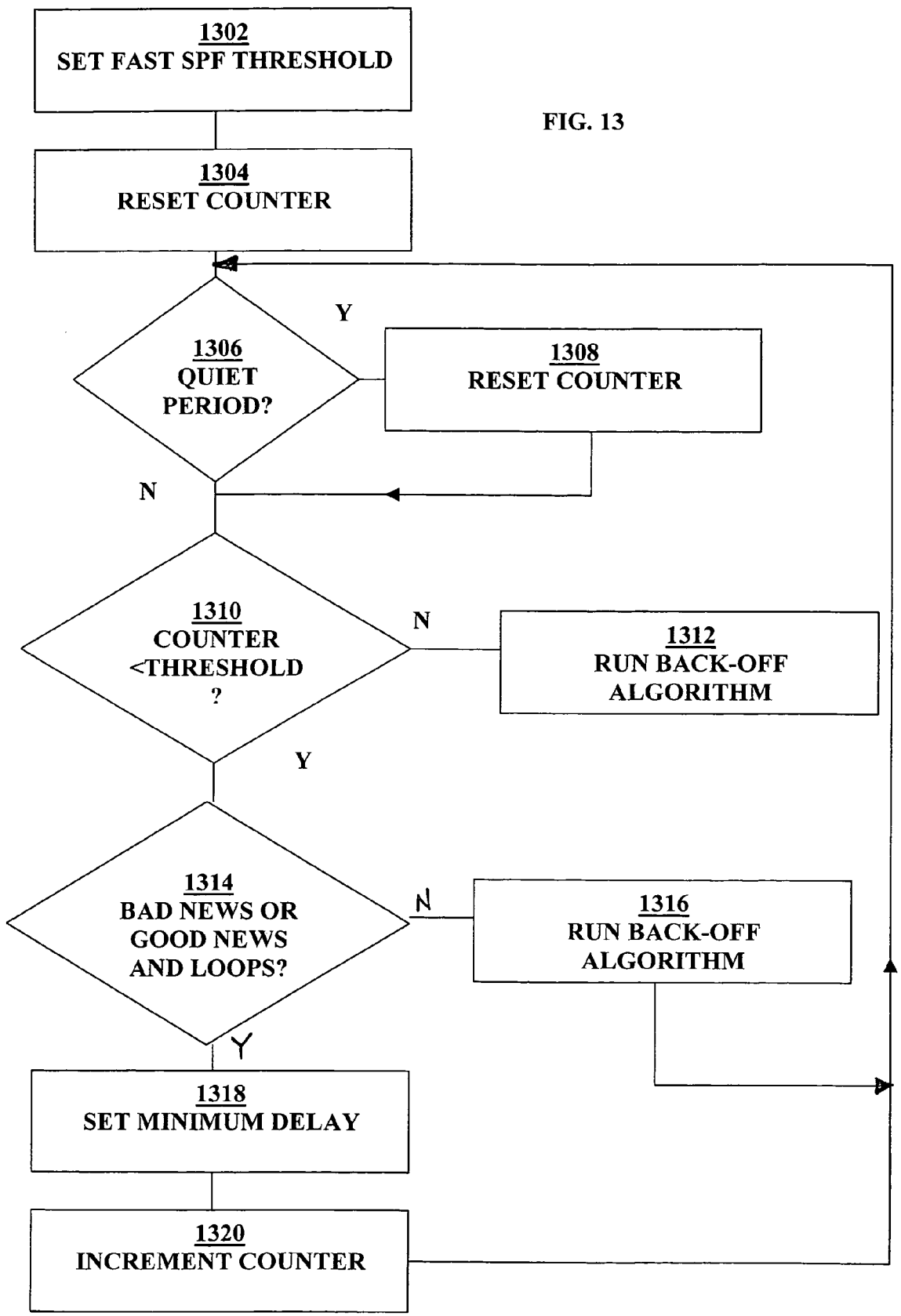
FIG. 13 is a flow diagram illustrating in more detail the steps involved in computing a routing calculation delay.

The threshold and delay computation steps involved can be better understood with regard to FIG. 13. Referring firstly to block 1302, the computing node sets a threshold after which the SPF delay should be computed according to the back-off algorithm, termed here fast_SPF_threshold. At step 1304 the computing node resets a counter which determines how many SPFs are being run concurrently ("fast_SPF_counter"). In block 1306 the computing node establishes whether there has been a quiet period, that is, a period during which the router has not run any SPF. As discussed above with reference to FIG. 1 such a quiet period can be set at, for example, 2*A where A is the maximum delay between two consecutive SPF computations. If there has been a quiet period then the counter is reset in block 1308 (repetition of the step is required in view of the looping properties of the algorithms discussed below). The computing node then proceeds to step 1310. If no quiet period is detected in block 1306 then the computing node proceeds directly to block 1310 on the other hand.

In block 1310 the computing node establishes whether the SPF counter has exceeded the threshold, that is, fast_SPF_counter<fast_SPF_threshold. If the SPF counter matches or exceeds the threshold this means that too many SPF calculations are being run during a short period of time and the computing node proceeds to block 1312 and runs on the appropriate back-off algorithm for example of the type described with reference to FIG. 1 above. Otherwise, in block 1314 computing node identifies whether the LSP carries bad news or good news but nonetheless introduces microloops. This information can be stored following completion of the procedure described above with reference to FIGS. 12A to 12C, or the procedure described above with reference to FIGS. 12A to 12C can be carried out at this stage in the process described in FIG. 13. If the LSP does not meet this condition, i.e. it carries good news that does not result in a microloop, no news or unknown news then in block 1316 the computing node runs the back-off algorithm in a similar manner to block 1312. The process then returns to block 1306 to await receipt of a further LSP. If, however, at block 1314 bad news or good news resulting in a microloop are detected then in block 1318 the routing calculation delay is set to a minimum value for example a value B representing an initial delay of the type described above with reference to FIG. 1. The process then proceeds to block 1320 in which the counter is incremented and the process reverts to block 1306 to await the next LSP.

As will be seen, each time the fast (minimum delay) SPF calculation is run the counter is incremented. As a result once a threshold value is reached representing too many consecutive SPF computations without significant delay between them, the system reverts to running the back-off algorithm. As a result multiple SPF computations with very short delays are avoided, avoiding accordingly compromises in system integrity and availability.

It will be appreciated that the process described above is one possible manner of ensuring a limited number of SPF calculations within an interval of time with minimum delay and that any other appropriate approach can be adopted.

Furthermore it will be appreciated that after the delays have expired the appropriate SPF computations are run according to normal operation of the node. However before execution of the SPF it is imperative that an LSP containing good or bad news should be flooded to the routers neighbors. For other types of LSPs normal flooding will occur after SPF computation. As a result, in particular where cases where looping is otherwise a possibility, the system is synchronized as quickly as possible.

It will be appreciated that after SPF computation the node must update its routing table for example its Routing Information Base (RIB). In some circumstances RIB update may be delayed by a timer. One example of this arises according to the process described in co-pending patent application Ser. No. 10/685,622, filed Oct. 14, 2003, entitled "Method and Apparatus for Generating Routing Information in a Data Communications Network" of Clarence Filsfils et al, (hereinafter referred to as Filsfils), the entire contents of which are incorporated by reference for all purposes as if fully set forth herein. According to the solution put forward in Filsfils, nodes delay updating their routing tables according to a predetermined sequence in order to avoid looping.

In implementation of the present method this may have happened during the previous SPF computation and therefore at the current SPF the RIB update timer may still be running. If it is still running it has to be stopped in order for the current SPF run to be computed and in particular in the present optimization the computing node, if it notes that a RIB update delay is running, will cancel the RIB update delay and update the RIB immediately.

As a result of the method and optimizations discussed above the system allows accelerated SPF computation for certain changes of state where this is desirable but in other circumstances reverts to longer and successively increasing delays of a type, for example, provided by a back-off algorithm.

The mechanism by which the methods and optimizations are discussed above are implemented will be well known to the skilled reader and do not require detailed discussion here. For example the additional code required to implement the method such as walking through the LSP and implementing the respective delays will be apparent to the skilled reader as a simple modification of the existing code. It will be appreciated that the method can be applied according to any link-state protocol and that the change of state can be advertised in any appropriate manner.

Furthermore any appropriate loop detection mechanism can be adopted and any manner of setting an upper limit to the number of consecutive SPF computations in a short time interval. Although the discussion about is principally directed to identifying changes of states dependent on cost as a metric, any other appropriate metric can be adopted.

4.0 Implementation Mechanisms—Hardware Overview

Figure 14:
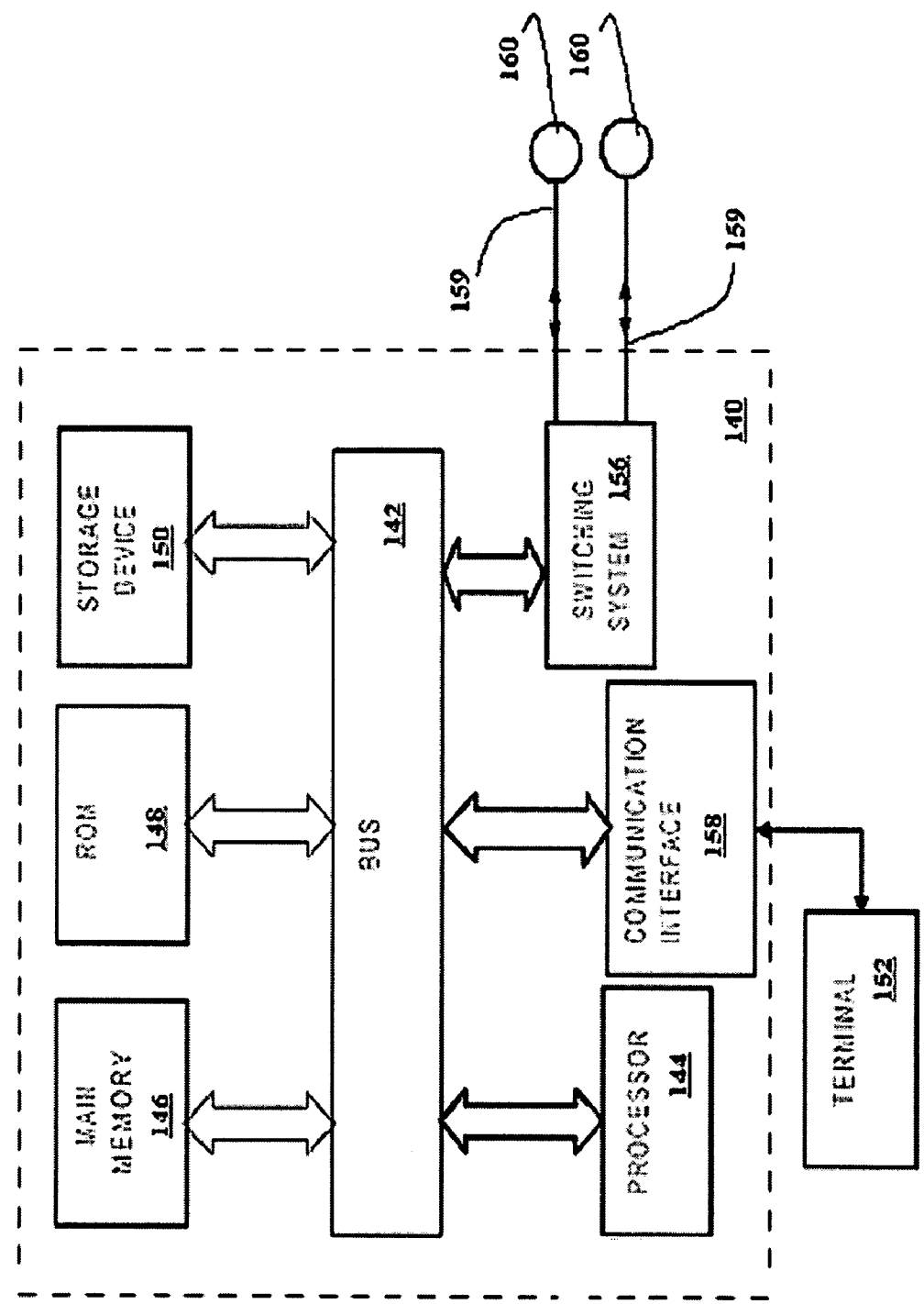
FIG. 14 is a block diagram illustrating a computer system upon which a method for determining a repair strategy may be implemented.

FIG. 14 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a computing node the above described method of computing routing information. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

It will be appreciated that any appropriate routing protocol can be used such as Intermediate System—Intermediate System (IS-IS) or Open Shortest Path First (OSPF). Similarly any appropriate network can provide the platform for implementation of the method.

In addition the method can extend to any appropriate network change and any type of network for example a local area network (LAN).

What is claimed is:

1. A method of computing routing information for a data communications network comprising a plurality of nodes, the method comprising the steps performed at a computing node of:

receiving from a remote node in the network a routing information update representing a change of state of the network;

processing the update to identify a change of state type;

in response to determining that the change of state type indicates that a traffic flow in the network is interrupted, setting a delay interval to provide sufficient time to compute new routing information in spanning trees; and in response to determining that the change of state type indicates that the traffic flow in the network is not interrupted, setting the delay interval to provide sufficient time to update existing routing information in the spanning trees and avoiding de-synchronization of existing routing information.

2. A method as claimed in claim 1 in which a first change of state type delay interval comprises a minimum delay interval and a second change of state type delay interval comprises a delay interval arranged to increase with successive computations of routing information.

3. A method as claimed in claim 2 in which the computing node maintains a routing map with optimized routes from the computing node to nodes in the network and the update includes an identification of the remote node and each network neighbor node thereto in which the step of processing the update comprises the step of identifying the remote node on the routing map and identifying at least one network neighbor node thereto on the routing map.

4. A method as claimed in claim 3 further comprising the step of selecting a network neighbor node and identifying a change of state in relation to the selected neighbor node as a first change of state type in at least one of a first case in which the optimized route to the neighbor node is less optimal as a result of the change of state and the remote node is a parent of the neighbor node in the routing map or a second case in which a neighbor node has been removed as a result of the change of state.

5. A method as claimed in claim 4 in which the first change of state type delay interval is implemented upon identification of the first change of state type.

6. A method as claimed in claim 5 in which the first change of state type delay interval is implemented if a first change of state type is identified for any network neighbor node.

7. A method as claimed in claim 5 further comprising the step of implementing the second change of state type delay interval if the number of first change of state type delay intervals running concurrently exceeds a threshold.

8. A method as claimed in claim 3 further comprising the step of selecting a network neighbor node and identifying a change of state in relation to the selected neighbor node as a second change of state type in at least one of a first case in which the network neighbor node is a new neighbor node and will become a remote node parent in the routing map upon computation of the routing information or a second case in which the optimized route to the neighbor node is equally or more optimal and the neighbor node is not a parent of the remote node in the routing map.

9. A method as claimed in claim 8 further comprising the step of carrying out loop detection.

10. A method as claimed in claim 9 further comprising the step of implementing the first change of state type delay interval upon detection of the second change of state type and detection of a loop.

11. A method as claimed in claim 3 further comprising the step of processing the update for each network neighbor node of the remote node.

12. A method as claimed in claim 1 in which the computing node maintains a routing database and in which, if update of the routing database has been delayed, the delay is cancelled prior to computing the routing information from the routing information update.

13. A method as claimed in claim 1 in which the routing information to be computed comprises an SPF.

14. A method as claimed in claim 1 in which the routing information update comprises an LSP.

15. A method as claimed in claim 3 in which the routing map comprises a spanning tree.

16. A method as claimed in claim 1 in which the routing information is computed according to a link-state protocol.

17. A computer readable medium encoded with computer executable instructions for computing routing information for a data communications network, which when executed by one or more processors, cause the one or more processors to perform a method of computing routing information for a data communications network comprising a plurality of nodes, the method comprising the steps performed at a computing node of:

receiving from a remote node in the network a routing information update representing a change of state of the network;

processing the update to identify a change of state type; and in response to determining that the change of state type indicates that a traffic flow in the network is interrupted, setting a delay interval to provide sufficient time to compute new routing information in spanning trees;

in response to determining that the change of state type indicates that the traffic flow in the network is not interrupted, setting the delay interval to provide sufficient time to update existing routing information in the spanning trees and avoiding de-synchronization of existing routing information.

18. A computer readable medium as claimed in claim 17 in which a first change of state type delay interval comprises a minimum delay interval and a second change of state type delay interval comprises a delay interval arranged to increase with successive computations of routing information.

19. A computer readable medium as claimed in claim 18 in which the computing node maintains a routing map with optimized routes from the computing node to nodes in the network and the update includes an identification of the remote node and each network neighbor node thereto in which the step of processing the update comprises the step of identifying the remote node on the routing map and identifying at least one network neighbor node thereto on the routing map.

20. A computer readable medium as claimed in claim 17 in which the computing node maintains a routing database and in which, if update of the routing database has been delayed, the delay is cancelled prior to computing the routing information from the routing information update.

21. A computer readable medium as claimed in claim 17 in which the routing information update comprises an LSP.

22. A computer readable medium as claimed in claim 17 in which the routing information is computed according to a link-state protocol.

23. An apparatus for computing routing information for a data communications network comprising a plurality of nodes, the apparatus comprising:

means for receiving from a remote node in the network a routing information update representing a change of state of the network;

means for processing the update to identify a change of state type; and means for setting a delay interval to provide sufficient time to compute new routing information in spanning trees in response to determining that the change of state type indicates that a traffic flow in the network is interrupted; and means for setting the delay interval to provide sufficient time to update existing routing information in the spanning trees and avoiding de-synchronization of existing routing information in response to determining that the change of state type indicates that the traffic flow in the network is not interrupted.

24. An apparatus as claimed in claim 23 in which a first change of state type delay interval comprises a minimum delay interval and a second change of state type delay interval comprises a delay interval arranged to increase with successive computations of routing information.

25. An apparatus as claimed in claim 24 comprising means for maintaining a routing map with optimized routes to nodes in the network, in which the update includes an identification of the remote node and each network neighbor node thereto in which the means for processing the update comprises means for identifying the remote node on the routing map and identifying at least one network neighbor node thereto on the routing map.

26. An apparatus as claimed in claim 25 further comprising means for selecting a network neighbor node and identifying a change of state in relation to the selected neighbor node as a first change of state type in at least one of a first case in which the optimized route to the neighbor node is less optimal as a result of the change of state and the remote node is a parent of the neighbor node in the routing map or a second case in which a neighbor node has been removed as a result of the change of state.

27. An apparatus as claimed in claim 26 in which the first change of state type delay interval is implemented upon identification of the first change of state type.

28. An apparatus as claimed in claim 27 in which the first change of state type delay interval is implemented if a first change of state type is identified for any network neighbor node.

29. An apparatus as claimed in claim 27 further comprising means for implementing the second change of state type delay interval if the number of first change of state type delay intervals running concurrently exceeds a threshold.

30. An apparatus as claimed in claim 25 further comprising means for selecting a network neighbor node and identifying a change of state in relation to the selected neighbor node as a second change of state type in at least one of a first case in which the network neighbor node is a new neighbor node and will become a remote node parent in the routing map upon computation of the routing information or a second case in which the optimized route to the neighbor node is equally or more optimal and the neighbor node is not a parent of the remote node in the routing map.

31. An apparatus as claimed in claim 30 further comprising means for carrying out loop detection.

32. An apparatus as claimed in claim 31 further comprising means for implementing the first change of state type delay interval upon detection of the second change of state type and detection of a loop.

33. An apparatus as claimed in claim 25 further comprising means for processing the update for each network neighbor node of the remote node.

34. An apparatus as claimed in claim 23 further comprising means for maintaining a routing database and arranged, if update of the routing database has been delayed, to cancel the delay prior to computing the routing information from the routing information update.

35. An apparatus as claimed in claim 23 in which the routing information to be computed comprises an SPF.

36. An apparatus as claimed in claim 23 in which the routing information update comprises an LSP.

37. An apparatus as claimed in claim 25 in which the routing map comprises a spanning tree.

38. An apparatus as claimed in claim 23 in which the routing information is computed according to a link-state protocol.

39. An apparatus for computing routing information for a data communications network comprising a plurality of nodes, the apparatus comprising: one or more processors;
- a network interface communicatively coupled to the processor and configured to communicate with one or more packet flows among the processor and network; and
- a computer readable medium encoded with computer executable instructions for computing routing information for a data communications network which, when executed by one or more processors, cause the one or more processors to perform a method of computing routing information for a data communications network comprising a plurality of nodes, the method comprising the steps performed at a computing node of:

receiving from a remote node in the network a routing information update representing a change of state of the network;

processing the update to identify a change of state type;

in response to determining that the change of state type indicates that a traffic flow in the network is interrupted, setting a delay interval to provide sufficient time to compute new routing information in spanning trees; and in response to determining that the change of state type indicates that the traffic flow in the network is not interrupted, setting the delay interval to provide sufficient time to update existing routing information in the spanning trees and avoiding de-synchronization of existing routing information.

40. An apparatus as claimed in claim 39 in which a first change of state type delay interval comprises a minimum delay interval and a second change of state type delay interval comprises a delay interval arranged to increase with successive computations of routing information.

41. An apparatus as claimed in claim 40 in which the computing node maintains a routing map with optimized routes from the computing node to nodes in the network and the update includes an identification of the remote node and each network neighbor node thereto in which the step of processing the update comprises the step of identifying the remote node on the routing map and identifying at least one network neighbor node thereto on the routing map.

42. An apparatus as claimed in claim 39 in which the computing node maintains a routing database and in which, if update of the routing database has been delayed, the delay is cancelled prior to computing the routing information from the routing information update.

43. An apparatus as claimed in claim 39 in which the routing information update comprises an LSP.

44. An apparatus as claimed in claim 39 in which the routing information is computed according to a link-state protocol.

* * * * *